United States Patent
Damstra

(10) Patent No.: US 10,440,190 B2
(45) Date of Patent: *Oct. 8, 2019

(54) SYSTEM, SMART DEVICE AND METHOD FOR APPORTIONING SMART DEVICE OPERATIONS AND COSTS

(71) Applicant: MOBILITY VIEW INC., Toronto (CA)

(72) Inventor: Thom Damstra, Toronto (CA)

(73) Assignee: Mobility View Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,570

(22) Filed: May 25, 2018

(65) Prior Publication Data

US 2018/0278753 A1    Sep. 27, 2018

Related U.S. Application Data

(63) Continuation of application No. 14/906,723, filed as application No. PCT/CA2014/050686 on Jul. 21, 2014.

(Continued)

(51) Int. Cl.
*H04M 11/00* (2006.01)
*H04M 15/00* (2006.01)
(Continued)

(52) U.S. Cl.
CPC ........ *H04M 15/07* (2013.01); *H04L 12/1478* (2013.01); *H04L 12/1485* (2013.01);
(Continued)

(58) Field of Classification Search
None
See application file for complete search history.

(56) References Cited

U.S. PATENT DOCUMENTS 5,862,203 A    1/1999  Wulkan et al.
5,915,214 A *  6/1999  Reece .................. H04M 15/49
                                                 379/114.01
(Continued)

FOREIGN PATENT DOCUMENTS

CA    2631976 A1    11/2009
CA    2638858 C     11/2009
(Continued)

OTHER PUBLICATIONS

PDF print out of http://www.cnews.ru/news/top/dell_vypuskaet_kompyuter_razmerom_s_fleshku, cited in Eurasian Patent Application No. 201690173 Office Action dated May 10, 2018 and Google translation http://www.cnews.ru/news/top/dell_vypuskaet_kompyuter_razmerom_s_fleshku.
(Continued)

*Primary Examiner* — Erika A Washington
(74) *Attorney, Agent, or Firm* — Borden Lander Gervais LLP; Brandon L. Evenson

(57) ABSTRACT

A system, smart device and method for apportioning costs of smart device operations between purposes. Operation information concerning operations performed by the smart device is recorded. The operations are apportioned between purposes based on categorization information and the operation information. The cost of the apportioned operations performed by the device is determined for the purposes based on the operation information and tariff information.

23 Claims, 4 Drawing Sheets

Related U.S. Application Data

(60) Provisional application No. 61/856,720, filed on Jul. 21, 2013.

(51) Int. Cl.
| | | |
|---|---|---|
| *H04L 12/14* | (2006.01) | |
| *H04L 29/12* | (2006.01) | |
| *H04L 29/08* | (2006.01) | |
| *H04W 4/24* | (2018.01) | |
| *H04L 12/58* | (2006.01) | |
| *H04L 12/26* | (2006.01) | |

(52) U.S. Cl.
CPC .......... *H04L 51/18* (2013.01); *H04L 61/1594* (2013.01); *H04L 67/02* (2013.01); *H04L 67/10* (2013.01); *H04L 67/22* (2013.01); *H04M 15/43* (2013.01); *H04M 15/44* (2013.01); *H04M 15/60* (2013.01); *H04M 15/61* (2013.01); *H04M 15/8022* (2013.01); *H04M 15/8033* (2013.01); *H04M 15/8044* (2013.01); *H04M 15/8055* (2013.01); *H04W 4/24* (2013.01); *H04L 43/0811* (2013.01)

(56) References Cited

U.S. PATENT DOCUMENTS

| | | | |
|---|---|---|---|
| 6,925,160 | B1 | 8/2005 | Stevens et al. |
| 7,089,005 | B2 | 8/2006 | Reddy |
| 7,957,718 | B2 | 6/2011 | Gaskarth et al. |
| 9,191,523 | B1 | 11/2015 | Leemet et al. |
| 9,723,154 | B2 * | 8/2017 | Damstra ............. H04L 61/1594 |
| 2002/0022472 | A1 | 2/2002 | Watler et al. |
| 2006/0121894 | A1 | 6/2006 | Ganesan |
| 2007/0135109 | A1 | 6/2007 | Walter et al. |
| 2007/0270123 | A1 | 11/2007 | Cai et al. |
| 2009/0149154 | A1 * | 6/2009 | Bhasin ................. H04M 15/00 455/406 |
| 2009/0180440 | A1 | 7/2009 | Sengupta et al. |
| 2009/0291665 | A1 * | 11/2009 | Gaskarth ................ G06Q 30/04 455/405 |
| 2010/0080376 | A1 | 4/2010 | Hartley et al. |
| 2010/0128857 | A1 | 5/2010 | Logan |
| 2010/0280931 | A1 | 11/2010 | Lim et al. |
| 2011/0276442 | A1 * | 11/2011 | Momtahan ............. G06Q 30/00 705/30 |
| 2013/0267198 | A1 | 10/2013 | Debenedictis et al. |
| 2014/0279454 | A1 * | 9/2014 | Raman .................... H04L 63/08 705/40 |
| 2014/0344922 | A1 * | 11/2014 | Lam ....................... G06F 21/629 726/19 |
| 2015/0312127 | A1 | 10/2015 | Leemet et al. |
| 2015/0312422 | A1 | 10/2015 | Leemet et al. |
| 2016/0044182 | A1 | 2/2016 | Leemet et al. |
| 2016/0381057 | A1 | 12/2016 | Das et al. |

FOREIGN PATENT DOCUMENTS

| | | |
|---|---|---|
| CA | 2885035 A1 | 10/2015 |
| CA | 2874127 A1 | 5/2016 |
| CN | 1468408 A | 1/2004 |
| CN | 102640479 A | 8/2012 |
| EP | 2947853 A2 | 11/2015 |
| JP | 2007081950 A | 3/2007 |
| JP | 2013089099 A | 5/2013 |
| WO | 2004077765 A1 | 9/2004 |
| WO | 2013057712 A3 | 4/2013 |

OTHER PUBLICATIONS

PDF print out of http://www.cnews.ru/news/top/microsoft_predstavila_windowspk_razmerom, cited in Eurasian Patent Application No. 201690173 Office Action dated May 10, 2018 and Google translation http://www.cnews.ru/news/top/Microsoft_predstavila_windowspk_razmerom.

* cited by examiner

SYSTEM, SMART DEVICE AND METHOD FOR APPORTIONING SMART DEVICE OPERATIONS AND COSTS

CROSS-REFERENCE TO RELATED APPLICATIONS

This is a continuation application of U.S. application Ser. No. 14/906,723 filed on Jan. 21, 2016, which is a National Stage Entry of International Application No. PCT/CA2014/050886, filed on Jul. 21, 2014, which is a non-provisional application of U.S. Provisional Application Ser. No. 61/856,720 titled MOBILE COST MANAGEMENT (MCM) SOLUTION, PROCESS, METHOD, SYSTEM, APP, DEVICE AND/OR COMPUTER READABLE MEDIUM filed on Jul. 21, 2013. This application claims priority from U.S. Provisional Application Ser. No. 61/856,320 filed on Jul. 21, 2013, International Application No. PCT/CA2014/050686 filed Jul. 21, 2014, and U.S. patent application Ser. No. 14/906,723 filed on Jan. 21, 2016, which are all herein incorporated by reference in their entirety.

FIELD

The present disclosure relates generally to the field of computing devices. More particularly, the present disclosure relates to apportioning operations and associated costs of computing devices.

BACKGROUND

Computing devices, such as mobile smart phones, send and receive communication signals through various channels. Those channels may include, for example WiFi networks, Ethernet networks, and cellular networks. With respect to a cellular network, computing devices may communicate via various channels of communication including data, voice, and text messages over the simple messaging service (SMS) or multimedia message service (MMS). A carrier or network operator provides channels of communication and charges a fee according to the amount of usage of a selected channel of communication in a period. For example, a carrier may charge a fee based on the amount of data (measured in bytes or megabytes) sent and received, the duration of a phone call in minutes or seconds, and the total number of texts sent and/or received.

A computing device typically has a plan or tariff associated therewith which is an agreement with the carrier or network operator regarding the amount the carrier will charge for the consumption of any of data, voice, and text by the computing device or a group of computing devices. For example, a tariff may permit an unlimited number of local evening and weekend voice call minutes, a limited number of local day time voice call minutes, a limited number of long distance voice call minutes, a limited number of text messages, and a certain amount of data in a month for a fixed fee. If the computing device consumes more than the maximum amount of minutes, text messages, or data, then the carrier may charge additional fees or an overage fee in accordance with the tariff.

An increasing number of individuals are each using only one computing device for both work and personal purposes. An individual may own the device and have a contract with a carrier or network operator for the communication of data, voice and text. Alternatively, an employer may own the device and have the contract with the carrier but provide the device to their employee.

There are a number of benefits associated with using only one device for both work and personal purposes. It may be difficult, however, to apportion the costs of device operations such as data traffic, text messages, and voice call minutes, between work purposes and personal purposes. Accordingly, it is desirable to have an easy method of calculating the costs results from the operations performed by a computing device so that an employee can be appropriately reimbursed by their employer for operation of an employee device for work purposes; an employer can appropriately bill an employee for operation of an employer's device for personal purposes, and a contractor can identify the amount of carrier charges it can expense for the purpose of calculating business income.

SUMMARY OF THE INVENTION

A system, smart device and method for apportioning costs of smart device operations between purposes is described. An application on a smart device records operation information concerning operations performed by the smart device. An operation may comprise, for example, placing a cellular voice call (also referred to as a cellular voice call operation) and the corresponding operation information may comprise, for example, the duration of the voice call and the telephone number to which the call was placed. Operations are performed for one or more purposes such as a personal purpose and a work purpose. Each operation has an associated monetary cost that is described, in general terms, by a tariff. An operation is apportioned to a selected purpose and may be done so based on categorization information such as the telephone number of a contact designated as relating to a work purpose and the operation information. The categorization information may be provided by a user, or may be obtained from a personal cloud such as the FACEBOOK™ server, or an enterprise information technology environment system or server such as a customer relationship manager server. The source of the categorization information may be used to designate contact information as relating to a particular purpose and may be used to apportion an operation to a particular purpose. The cost of the apportioned operations is determined for one or more purposes based on the operation information and tariff information. The application on the smart device, or a separate application running on a computer, may apportion operation information to purposes, obtain categorization information, and determine the cost of the operations for each purpose.

DETAILED DESCRIPTION

Figure 1:
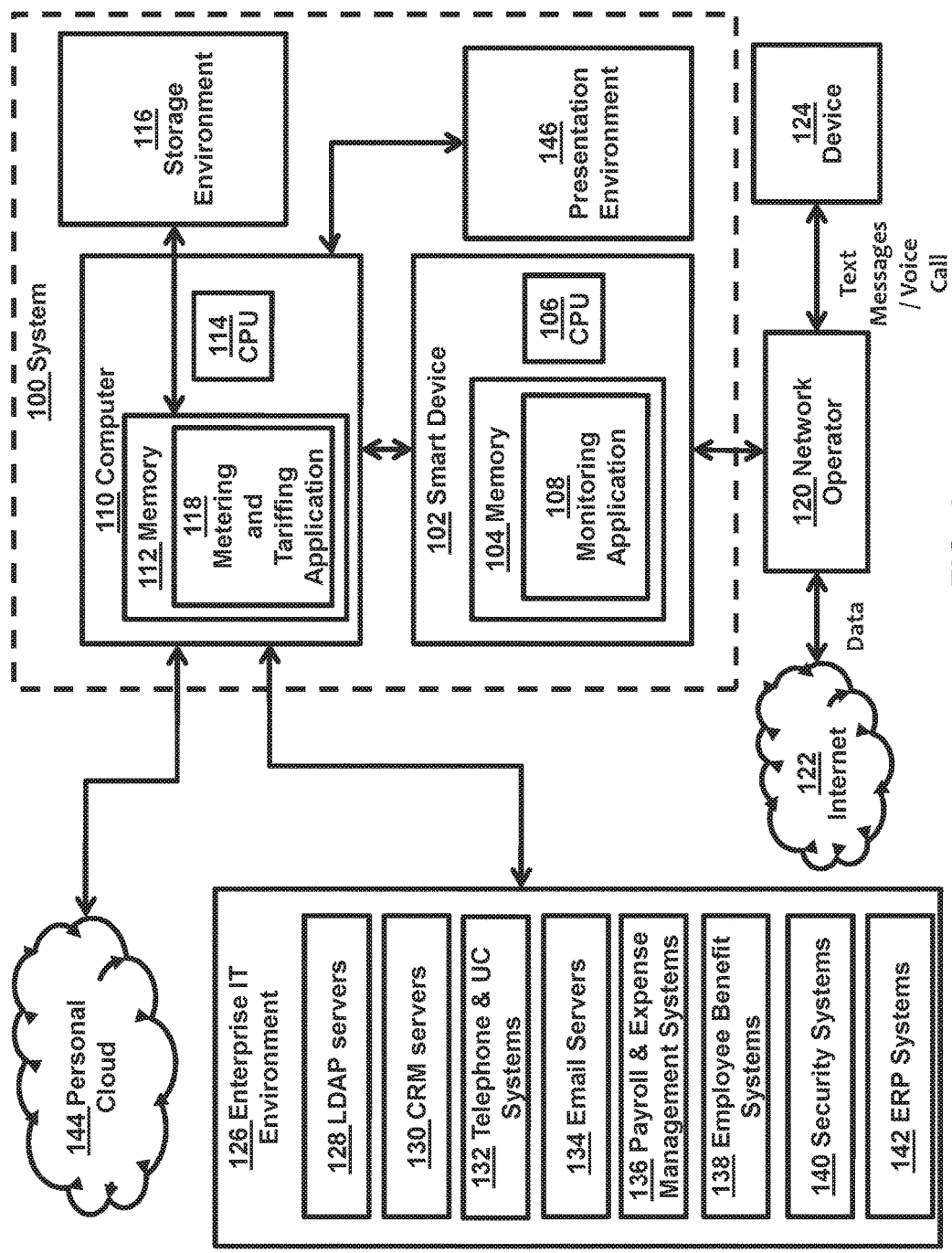
FIG. 1 shows a diagram of a system for apportioning smart device operations between purposes in accordance with an embodiment of the present disclosure.

FIG. 1 shows a diagram of a system 100 for apportioning operations of a smart device 102 between purposes in accordance with an embodiment of the present disclosure. The smart device 102 may be any computerized device which can be programmed such as, for example, a mobile phone, a tablet, a personal computer, a smart television, a router, or any similar electronic device. The smart device 102 comprises a memory 104 and a computer processing unit (CPU) 106. The memory contains a monitoring application 108 which is executed by the CPU 106. The smart device 102 can access a network operator (also referred to as a carrier) 110 through various connection types such as, for example, a wireless cellular connection using the Global System for Mobile Communication (GSM) standard or any other similar standard, a wired connection, a WiFi connection, and a Bluetooth connection. The network operator 120 connects the smart device 102 to the Internet 122 so as to permit data or information to pass between the smart device 102 and the internet 122. The network operator 120 also connects the smart device 102 to other devices 124 to permit information in the form of text messages and voice calls, to pass therebetween. The monitoring application 108 collects or records information concerning one or more operations performed by the smart device 102 as operation information. Operations may comprise, for example, placing or receiving cellular voice calls, sending or receiving text messages, browsing an internet webpage, sending or receiving an email, etc. An operation is an activity or event performed by the smart device 102 and operation information is information relating to the event. For example, the with respect to an outgoing cellular voice call operation, the monitoring application may record the telephone number and duration of the call. The operations being recorded may have a monetary cost.

The system 100 also comprises a computer 110 which may be in communication with, or part of, a backend information technology system or a cloud server environment such as AMAZON WEB SERVICES™. The computer 118 is also in communication with the smart device 102. The computer 110 and smart device 102 may communicate directly with one another through a local area network (LAN), or through the internet 122 via the smart device's 102 data connection with the network operator 120. The computer 110 comprises a memory 112 and a CPU 114. The memory 112 comprises metering and tariffing application 118 which is executed by the CPU 114. The metering and tariffing application 118 exchanges information with, among other things, the monitoring application 108.

The computer 110 may be in communication with a storage environment 116. The storage environment 116 may be used for storing information received, collected, or generated by the metering and tariffing application 118. In an embodiment, the network operator 120 may pass data traffic through a proxy server or gateway server prior to the data being communicated to or received from the internet by the smart device 102. In accordance with an embodiment of the present disclosure, the computer may be the smart device 102, and the functionality of the metering and tariffing application 118 may be within the monitoring application 108 on the smart device 102.

The metering and tariffing application 118 may be in communication with an enterprise information technology (IT) environment 126 and a personal cloud 144. The metering and tariffing application 118 collects or receives categorization information from one or more of the enterprise IT environment 126, the personal cloud 144, the smart device's 102 user, and other information provisioned or provided manually by any person, to help determine or apportion the operations of the smart device 102 between one or more purposes. Apportioning an operation to a purpose means categorizing, classifying, or identifying the operation as relating to a particular purpose or reason for which the operation was performed. This may involve, for example, supplementing the operation information with a description or identifier of the purpose. The term purposes refer to the reason for which a user of the smart device 102 caused, directly or indirectly, the smart device 102 to perform an operation. The user may cause the smart device to perform an operation for, for example, a work purpose or a personal purpose. An operation performed for a work purpose may be an action taken by the smart device which furthers the business of the user of the smart device. The action may relate to the user's job description within their organization.

The enterprise IT environment 126 may comprise, for example, a single computer running an application, or may comprise many servers located in an enterprise environment across a wide area, each server running multiple applications. The enterprise IT environment 126 may comprise lightweight directory access protocol (LDAP) servers 128 such as MICROSOFT ACTIVE DIRECTOR™, client relationship management (CRM) servers 130, telephony & unified communication systems 132, electronic mail (email) systems 134 such as MICROSOFT EXCHANGE SERVER™ and OUTLOOK™/LOTUS NOTES™, payroll and expense management systems 136, employee benefit systems 138, smart device security systems 140, enterprise resource planning (ERP) systems 142, and other information technology systems. Other systems which may be accessed by the metering and tariffing application 118 include human resource (H/R) systems. An ERP system may be any system (including without limitation an accounts receivable, accounts payable, partnering, and vendor management system) that contains information the metering and tariffing application 118 may use to help apportion operations of the smart device 102 between purposes including work and personal purposes.

The personal cloud 144 comprises publicly available web services, social media services, and social networking services such as FACEBOOK™, LINKED™, GMAIL™, TWITTER™, TUMBLR, HOTMAIL™, YAHOO MAIL™, GOOGLE DOCS™, OFFICE 365™, INSTAGRAM™, VIBER™, LINE™, MYSPACE™, and WHATSAPP™. The smart device's 102 user may have personal accounts, comprising personal information, with services provided via the personal cloud 144.

The metering and tariffing application 118 may be controlled through a presentation environment 146. The presentation environment 146 may also allow users to view operation information associated with their smart device 102 and related costs for personal and work purposes. The presentation environment 146 may be the smart device 102 itself. The presentation environment 146 may also allow viewing of standardized and customized reports.

Figure 2:
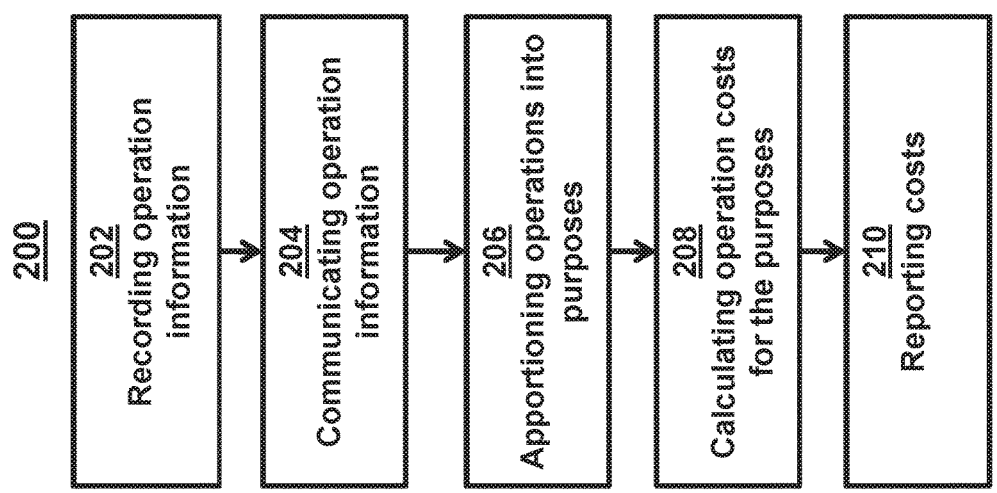
FIG. 2 shows a diagram of a method for calculating smart device operations costs in accordance with another embodiment of the present disclosure.

FIG. 2 shows a flow chart of a method 200 for determining work and personal costs associated with the operations of a smart device with the system of FIG. 1 in accordance with an embodiment of the present disclosure. The monitoring application 108 logs or records one or more operations of the smart device 102 as operation information 202. The operation information is communicated 204 to the metering and tariffing application 118. The metering and tariffing application 118 applies a series of rules to the operation information to apportion 206 the operation into a selected purpose from one or more purposes (also referred to as a plurality of purposes). In effect, apportioning the purpose involves classifying the corresponding operation information in a particular group which relates to the apportioned purpose. The plurality of purposes may be a work purpose and a personal purpose. One of the plurality of purposes may be a "to-be-decided" or uncategorized purpose. The operation may be apportioned based on the operation information and categorization information. The metering and tariffing application 118 then combines the operation information with tariff information for calculating the monetary cost of the apportioned operation 208. The metering and tariffing application 118 may sum the costs of all operations apportioned to the same purpose and provide a summary for each purpose. The sum of the costs of all operations apportioned to the same purposes are reported 210 for each of the purposes.

Operation Information.

During the step of recording operation information 202 about an operation performed by the smart device 102, the monitoring application 108 may record the configuration of the smart device 102, information relating to communications between the smart device 102 and network operators 120, the type of each operation, the type of each communication, the channel of each communication, the amount of each communication, the contents of each communication, the recipients and initiators of each communication, and where the smart device 102 was located at the time of the communication. What operation information is collected depends, in part, on the types of operations which are to be apportioned. The types of operations include, without limitation, cellular voice call operations, SMS/MMS text message operations, data consumption from website browsing operations, data consumption from applications operations, data consumption from using voice recognition application operations, data consumption from mapping application operations, data consumption from tethering operations, data consumption from VOIP application operations, data consumption from email operations, and purchasing operations.

For example, operation information may comprise the amount of time spent on a voice call, the outgoing or incoming telephone number of the voice call, and the contact information associated with the voice call; the amount of data sent and received while browsing a webpage and the URL of that webpage; the times when the smart device 102 had cellular network connectivity, WiFi connectivity, Bluetooth connectivity, and tethering connectivity; LAC codes when there was cellular network connectivity; and GPS coordinates when there is a change in connectivity.

Each of the types of operations, for which operation information may be collected by the monitoring application 108, is further described below.

Initialization of the Monitoring Application.

In an embodiment of the present disclosure, upon installation of the monitoring application 108 on the smart device 102 or on a periodic basis thereafter, the monitoring application 108 collects or records and provides operation information about the smart device 102 to the metering and tariffing application 118. The operation information may be stored by the metering and tariffing application 118 in a device database (as described below in relation to FIG. 3).

Operation information may comprise the smart device's 102 phone number, the international Mobile Station Equipment Identity (IMEI) number, the country code of the smart device 102, the area code of the smart device 102, the serial number of the smart device 102, and the cellular network operator associated with the smart device 102. The information may be retrieved from the smart device's 102 SIM card. This information may assist with determining whether the smart device 102 is roaming.

The metering and tariffing application 118 may also collect categorization information from the smart device 102 upon installations or thereafter on a periodic basis. Categorization information comprises, for example, contacts and applications (and associated internet protocol (IP) addresses). That categorization information may be categorized or classified manually and automatically as relating to a work purpose or a personal purpose as further described below in relation to FIG. 3. The monitoring application 108 may also present the user of the smart device 102 with a list of their contacts and applications for categorization or confirmation of the categories assigned by the metering and tariffing application 118. If a contact or application was incorrectly categorized or not categorized, the user may select the appropriate category which causes the monitoring application 186 to update the list of contacts and applications maintained by the metering and tariffing application 118.

Upon installation or on a periodic basis, the monitoring application 108 may also ask the user of the smart device 102 to classify the current location of the smart device as either a work location, a home location, or an other location. If the user identifies the location as "other," the monitoring application 108 may continue to prompt the user on a periodic basis to identify their current location until the user has selected at least one location as a work location and another location as a home location. When a user selects a work location or a home location, the monitoring application 108 records the current local area code (LAC) of the smart device 102, and the global positioning system (GPS) coordinates of the smart device 102. If the user selects work or home, the user may also be prompted to input work or home WiFi information, if available, including SSID, encryption type, password, and user identification. If information concerning a WiFi hotspot or base station is provided by the user, and WiFi is available, the monitoring application 108 disables the cellular data connection, enables the WiFi connection, and logs onto the WiFi hotspot. The monitoring application 108 monitors the LAC and the WiFi connection and when a change occurs, the cellular data connection is re-enabled and WiFi is disabled. Disabling the cellular data connection when the WiFi is available helps route data traffic through the WiFi connection to reduce monetary costs and power consumption costs which in-turn helps to preserve the smart device's 102 battery life.

Connectivity Status.

Operations information may also comprise the connectivity status of the smart device 102 including, without limitation, cellular network connectivity. WiFi connectivity, Bluetooth connectivity, and tethering connectivity. When a smart device 102 registers with a cellular network, that event or operation may be recorded, along with the: LAC Code; Cellular Operator Name; Time and/or Date of the event first starting (beginning state); GPS coordinates, if the OPS functionality may be turned on and/or available. When a cellular network changes and/or there may no longer be any cellular connectivity, the time and/or date of the event may be recorded (end state). When a smart device 102 registers with a WiFi network, that event may be recorded along with: LAC Code; Cellular Operator Name; WiFi SSID; WiFi MAC Address; Device IP Address; DNS and/or other related information; Time and/or Date of the event first starting (beginning state); GPS coordinates if the GPS functionality may be turned on and/or available. When a WiFi network changes or there is no longer any WiFi connectivity, the time and/or date of the event may recoded logged (end state). When a smart device 102 connects to a Bluetooth device, that event may be recorded along with: LAC Code; Cellular Operator Name; WiFi SSID; WiFi MAC Address; Smart device 120 IP Address; DNS and/or Other related information; Time and/or Date of the event first starting (beginning state); GPS coordinate if the GPS functionality may be turned on and/or available. When Bluetooth connectivity changes and/or there may no longer be any Bluetooth connectivity, the time and/or date of the event may be also recorded (end state).

Apportioning Operations.

The metering and tariffing application 118 may be provisioned or configured with one or more rules. Rules provide the automated process by which the metering and tariffing application 118 apportions or classifies smart device 102 operations to purposes such as personal and work purposes. Without rules, it would be too difficult, onerous, and slow to manually review operation information and apportion smart device operations 102 between purposes. Rules may be applied to all smart devices 102.

The following are examples of potential rules which a metering and tariffing application may apply: All operations comprising emails from or to a "hotmail.com" domain are apportioned to a personal purpose. All contacts comprising emails have a "hotmail.com" domain are categorized to a personal purpose. All contacts in any ERP/enterprise IT System are categorized to a work purpose. Applications of a certain type may all be categorized for either a work or a personal purpose. All operations comprising emails from a corporate address book are apportioned to a work purpose. All contacts obtained from a corporate address book are categorized to a work purpose. Any contact that has a domain associated with a publicly provided email system is categorized as a personal purpose. Any domain that corresponds to any contact within the ERP/Enterprise IT system is categorized as a work purpose. Specific websites of a specific user or smart device 102 may be categorized as work or a personal purpose. Specific websites of users of the same department may be categorized as either a work or a personal purpose. Users may have a list of phone numbers which normally would be categorized as personal but, when travelling for work, are categorized as for a work purpose. Certain apps which would otherwise be categorized as for a personal purpose are categorized as for a work purpose when the user is travelling for work (e.g. SKYPE™). An employee reimbursement for use of home WiFi for work purposes. If certain operations cannot be automatically apportioned, the operation is deemed personal until designated otherwise by the user to encourage users to self-police and use the system.

Figure 3:
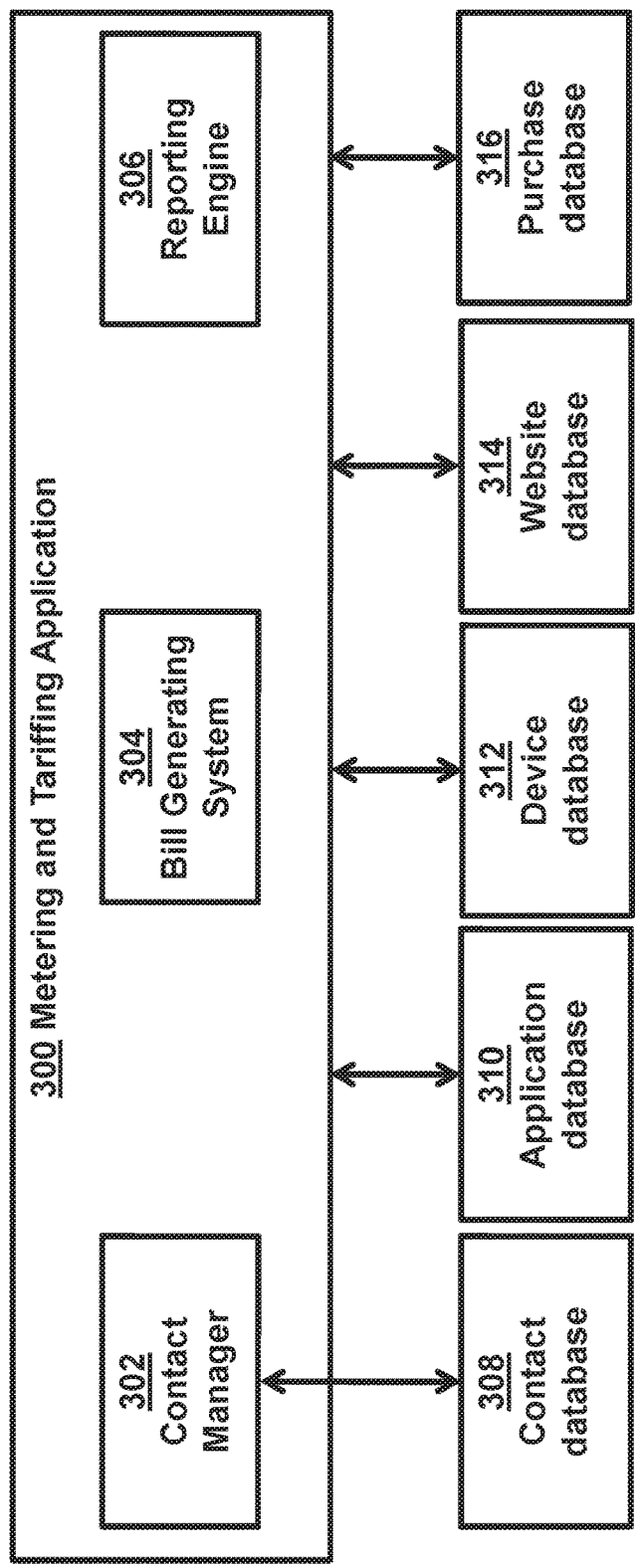
FIG. 3 shows an embodiment of the metering and tariffing application as shown in FIG. 1 in accordance with the present disclosure.

FIG. 3 shows a diagram of a metering and tariffing application 300 in accordance with an embodiment of the metering and tariffing application 118 shown in the system 100 of FIG. 1. The metering and tariffing application 300 comprises a contact manager 302, a bill generating system 304, and a reporting engine 306. The metering and tariffing application 300 maintains a number of databases containing categorization information to assist with automatically apportioning operations between work and personal purposes based on the operation information. The categorization information is received from a number of sources including the enterprise IT environment 126 and the personal cloud 144. The categorization information is processed and retained in the databases. The categorization information is combined with the rules to apportion operations using the corresponding operation information. The databases may reside in the memory 112 of the computer 100 or in the storage environment 116. The databases may comprise a contact database 308, an application database 310, a device database 312, a website database 314, and a purchase database 316.

The contact manager 302 maintains the contact database 308. This contact database 308 comprises contact information which is unique for each user or each smart device 102. The contact information in the contact database 308 for any user or smart device 102 may also be accessible or available to the monitoring application 108 of any other smart devices 102 which are part of the system 100, and may also be available to servers and systems in the enterprise IT environment 124. In this way, the contact information of a user or smart device 102 may be used to help apportion the operations of another smart device 102. The contacts database 308 comprises the names of organizations and individuals with whom the company and the user of the smart device 102 each has a relationship and associated details including, without limitation, their telephone numbers, fax numbers, email addresses, home postal addresses, work postal addresses, any other mode of contact, the location or source from which that contact information was obtained, and a designating indicating whether the contact information is either relating to a work purpose or a personal purpose. The designation may apply to an individual contact or contacts from the same company, or may be for specific modes of contact for an individual or company such as by telephone number or by email address.

Contact information is collected or received by the contact manager 302 and stored in the contacts database 308. The contact manger 302 may collect contact information initially when a smart device 102 is added to the system 100 or when the monitoring application 108 is installed on the smart device 102 as further described above. The contact manager 302 may also collect or re-collect contact information on a continuous or periodic basis, or when the contact information changes on any source from which it is collected. The contact manager 302 may also maintain a history of all changes to contact information occurring on the smart device 102 and within the enterprise IT environment 12, including changes between work and personal purposes categories. The contact manager 302 also filters or categorizes each of the contacts into either work, personal, or unknown purposes. Contact information can also be filtered or categorized manually into work or personal by the user of the smart device 102 or any other person such as a system administrator. The contact information may be collected or received by the contact manager 302 from various locations or sources including the smart device 102, the enterprise IT environment 126, the personal cloud 144, and other websites including regulatory agencies that designate a telephone number as either corresponding to a mobile device or fixed line using a prefix system or equivalent. The contact manager 302 may obtain the contact information by various means including through APIs. The contact manager 302 may also scrape contact information from webpages if an API is not available.

The locations from where contact information may be received or retrieved (as referred to as obtained) from the enterprise IT environment 126 include, without limitation, email systems, LDAP servers, CRM servers, telephone & UC systems, payroll & expense management systems, employee benefits systems, corporate PBX system, Voice Over Internet Protocol (VOIP) systems. Locations from where contact information may be obtained from the person cloud 144 include VOIP orients such as SKYPE™, social network websites such as FACEBOOK™, professional networking websites such as LINKEDIN™, email services such as GMAIL™, and applications installed or accessed by the smart device 102.

When contact information is obtained from the personal cloud 144, the contact manager 302 may apply a rule, if so provisioned, that categorizes each contact therein as relating to a personal purpose unless the contacts are received from LINKEDIN™ or a similar professional networking service in which case the contacts are categorized as relating to a work purpose. When contact information is received from the enterprise IT environment 126, the contact manager 302 may apply a rules, if so provisioned, that categorizes each of the contacts as relating to a work purpose. Contact information received from the smart device 102 may be from the address book or the SIM card.

Rather than categorize an entire contact as either relating to a work or personal purpose, the contact manager 302 applies a rule, if so provisioned, which categorizes each mode of contact for the contact (such as phone numbers). Contacts may also be automatically designated or categorized as personal by: the contact manager 302 if they have a personal cloud email address such as, for example "@hotmail.com". The contact manager 302 may also categorize certain contacts, including these with an email address in the corporate email system and stored on the smart device 102 or elsewhere, that do not match any of the email addressee stored in a contact in the examples given above.

In accordance with an embodiment of the present disclosure, the contact manager 302 may, if provisioned with the rule, learn how to more accurately categorize contact information as work and personal. Each time contact information is collected, the contact manager 302 determines whether the contact information (such as telephone number, email address, etc.), already exists in the contacts database 308. If the contact information exists, then the category already assigned to the contact information in the contacts database 308 is compared to the category to be assigned to the contact information by the contact manager 302 based on its source. If the categorizations match, then a counter specific to that contact information is incremented. If any counter reaches a threshold number, then the categorization of that contact information is deemed to be verified. Unless manually by-passed, the contact manager 302 does automatically re-categorize the categorization of verified contact information. Unverified contact information, however, may be re-categorized by the contact manager 302 if it determines that a category, different than the one indicated in the contacts database 308, should be applied to certain contact information. This allows the contact manager 302 to learn how to more accurately categorize contact information based on the categorizations of the same contact information by other users of the system 100.

In accordance with another embodiment of the present disclosure, the metering and tariffing application 300 may monitor the number of times a particular phone number is dialed, a phone number is text messaged, an email address is emailed, a website is visited, and an application is downloaded across all smart devices 102 that are part of the system 100. When the number of times reaches a threshold number, the associated phone number, email address, website and application is automatically designated as work and the metering and tariffing application 118 sends a notification that the threshold has been met. The automatic designation may then be accepted or rejected by, for example, a system administrator.

The monitoring application 108 may comprise an email plug-in that permits it to access the email client's address book on the smart device 102 so as to automatically synchronize the contacts in the smart device's 102 address book, the email client's address book, and enterprise IT environment 128 using the contacts database 308 managed by the contact manager 302.

The metering and tariffing application 300 uses the work and personal categories assigned to contact information in the contact database 308 to help automatically apportion certain smart device 102 operations between work and personal purposes, and to determine the amount or monetary value of personal and work purposes of the smart device 102. Contact information may be used to apportion at least the following types of smart device uses: cellular voice, SMS and MMS text Messages, data use from accessing websites, data use from VOIP, data use from mapping, data use from certain voice recognition functions, and data use from sending and receiving emails. Other smart device operations may need to be apportioned into work and personal based on information other than contact information. Other smart device operations include, without limitation, data use from applications, data use from voice recognition functionality, data use from tethering other devices to the smart device 102, data use from purchases made with the smart device 102, charges incurred as a result of purchases made with the smart device 102.

Calculating Operation Costs.

During the step of calculating operation costs 208, the metering and tariffing application 118 uses tariff information, in combination with the operation information, to determine or calculate the costs for each operation or all operations collectively for each of the apportioned purposes. A tariff is a set of contractual terms or rules describing, generally, how a carrier or network operator will charge for the consumption of data, voice, and text by one or more smart devices using the carrier's network or channels of communication. Tariffs may exist for any method of communication such as, for example, cellular, high speed internet, fixed line and WiFi methods of communication. In an embodiment, the metering and tariffing application 118 combines operation information about the smart device 102 with tariff information to determine the monetary cost of each of the purposes of the apportioned operations of the smart device 102. By putting a monetary value on smart device 102 operations, the user may be reimbursed for work operation of a personal smart device, or may reimburse for personal operation of a work smart device. Tariffs may be input into the application 108 on the smart device 102 or in the metering and tariffing application 118 on the computer 110 through the presentation environment 146. Tariff information consists of general cost information such as, for example, a voice call rate per second or minute in a period; SMS or message rate per number of messages sent and received in a period; and data rate measured by the number of bytes or megabytes of data sent and received in a period. The rates may differ based upon the location of the smart device, the location of the other device with which the smart device is communicating, whether the voice call is outgoing or incoming, whether messages and data are being sent or received. Different rates for voice calls may exist for inbound and outbound calls for each of domestic, international, roaming, and long distance calls. Different rates for data and SMS messages may exist for data sent and received locally, nationally, internationally, and while roaming. Tariff information may also include the amount the user paid for the smart device 102, the number of periods in the user's carrier contract, base periodic costs (e.g. monthly costs) paid by the user to the carrier for the use of that smart device 102 on the carrier's network. The metering and tariffing application 118 combines tariff information with smart device operation information to determine operation costs. For example, the metering and tariffing application 118 would know, based on one or more of the SIM status, the cellular operator name that the device was on, and the LAC and GPS coordinates, whether the smart device 102 was roaming at the time of making a voice call, sending or receiving a text message, or sending or receiving data. If the metering and tariffing application 118 determines that the smart device 102 was roaming, the metering and tariffing application 118 would determine the cost based on the corresponding tariff for roaming. Tariff information may also describe a carrier's terms for use of a specific application, and visits to a specific websites. Network operators or the designees may also permit data traffic associated with a website or application to be "free" so as not to count towards monthly data consumption allotments, if any. The metering and tariffing application 118 may be provisioned with tariff information setting out the amounts or costs for which a network operator 120 charges for certain uses of the smart device 102.

Billing and Reporting.

Once the operations are apportioned and costs determined, the bill generating system 304 combines or aggregates usage and cost information together. The bill generating system 304 may first calculate the personal and work consumption associated with the smart device 102 for a period corresponding with the billing period for the tariff. The personal and work consumption may then be used to calculate the actual monetary cost of personal and work purposes for the billing period and generate a bill for the user. The bill and the underlying consumption calculations may be accessible via the presentation environment 146, and may be emailed to the user for expense submissions. In an embodiment, only operations and cost that have been apportioned to work is reported so as to help protect the user's privacy. The bill generating system may also allow for automated expense management by automatically providing the calculated costs to ERP systems such as H/R, payroll and expense management systems. The monetary cost of the personal or work operations may then be incorporated into expense submission or payroll systems.

There are various method through which tariff information may be combined with operation information to calculate the costs associated with operation of the smart device. The way in which the information is combined depends upon the tariffs described by the tariff information. For example, there may be a tariff for cellular voice calls. The tariff may provide for a monthly fee for a certain number of free daytime minutes, and a per minute fee for each daytime voice minute consumed beyond the number of free daytime minutes. There may also be apportioned operation information describing the number of daytime minutes consumed for work and personal purposes beyond the number of free daytime minutes. In an embodiment, the metering and tariffing application 118 determines the cost of the operations for each of the purposes by dividing the fixed monthly fee according to the ratio of the number of free daytime minutes consumed for work purposes and of the of free daytime minutes consumed for personal purposes, and adding to each result the costs of the per minute price for overage minutes multiplied by the number of overage minutes for each purpose. The way in which tariff information is combined with operation information may be provisioned into the metering and tariffing application 118.

The reporting engine 306 produces reports (including operations and cost) of one or more smart devices 102 in communication with the metering and tariffing application 118. The reports may show information from call logs, SMS logs, email logs, application logs, website logs, etc., including consumption and operations activity apportioned between personal and work purposes. The reports may be for one smart device 102 or an aggregate of multiple smart devices 102 and may be broken out by usage type, department, function, and by P&L. The reports may be customized.

The bill generation system and reporting engine automatically costs smart device 102 operations. If an employee is owed money by their employer for a personal smart device, the amount associated with the aggregate work operations for the billing period is calculated. Through integration with the Expense Management/Payroll systems the employee is automatically reimbursed for any amount that is due. In the event that the employer wishes to claw back for personal operations, this amount is deducted from the next payroll/expense submission automatically Cellular Voice Call Operations.

In accordance with an embodiment of the present disclosure, cellular voice call operations are apportioned between personal and work purposes using contact information contained in the contact database 308. The monitoring application 108 obtains operation information associated with voice calls from, for example, an API, or the call history or call log maintained by the smart device 102. Cellular voice call operation information may include call duration, the phone number associated with a call, the contact associated with a call, the time and date of a call, and the LAC code, cellular network name, and GPS coordinates of the smart device 102 at the time of the call. Cellular voice call operation information is sent to the metering and tariffing application 118 which cross-references to contact information in the contacts database 308 to attempt to determine whether a call was for personal or work purposes depending on how the corresponding contact, or phone number is categorized in the database by the contact manager 302. If the call can be automatically apportioned, the metering and tariffing application 118 allocates the duration of the cellular voice call operation to the corresponding purpose. In effect, the location from which contact information is received is used to determine whether to allocate a particular voice call operation to a work or personal purpose. If the contact information location is associated with work such as, for example, a system or server in the enterprise IT environment 126, then a cellular voice call operation corresponding to that contact information is categorized by the metering and tariffing application 118 as work. By contrast, if the location from which the contact information was received is from a system or server or service in the personal cloud 144 (except a professional networking services), then a cellular voice call corresponding to that contact information is apportioned to a personal purpose. If the contact is associated with work or personal, then a call corresponding to that contact information is apportioned by the metering and tariffing application 118 as work or personal, respectively. If the phone number or contact associated with the call operation information cannot be located within the contacts database 308, the metering and tariffing application 118 may cause the monitoring application 108 to prompt the user to categorize the call as either for a work or personal purpose, or associated the call with an existing contact in contacts database 308. The monitoring application 108 may also prompt the user to create a new contact based on the call information. If a new contact is created, that contact information may then be saved to the contacts database 308 so as to be available to all smart devices 102 in the system 100 to assist with automatically categorizing smart device use. If the monitoring application 108 cannot access the call history or log on the smart device 102, the monitoring application 108 may monitor the hardware and/or software APIs associated with the telephony stack on the smart device 102. When a call occurs, the change in the state of the hardware and software is recorded and associated with the call. The monitoring application 108 may then time the duration of the call. The monitoring application 108 records the duration of the call, the date of the call, and the phone number associated with the call and provides this information to the metering and tariffing application 108 for apportionment in accordance with the process described above.

Text Message Operations.

In accordance with an embodiment of the present disclosure, SMS and MMS text message operations are apportioned between personal and work purposes. Similar to apportioning cellular voice calls, the monitoring application 108 obtains information associated with text messages sent and received by the smart device 102. The text message operation information may be received from an API or text message history or log. The text message operation information comprises the time and date of the message, the length of the message, the phone number associated with the message, the contact associated with the message if any, the LAC code, cellular network name, and GPS coordinates of the smart device 102 at the time of sending or receiving the message to determine whether the smart device 102 was roaming. The text message operation information is sent to the metering and tariffing application 118 which cross-references to categorization information, such as contact information in the contacts database 308, to attempt to determine whether the text message operation was for personal or work purpose depending on how the corresponding contact or phone number is categorized in the database. If the text message operation can be automatically apportioned, the metering and tariffing application 118 allocates the text message operation to the corresponding purpose. If the text message cannot be apportioned or categorized because the phone number or contact cannot be located within the contacts database 308, the metering and tariffing application 118 may cause the monitoring application 108 to prompt the user to categorize the text message operation as either for a work or a personal purpose, or associate the text message with an existing contact in the contacts database 308. The monitoring application 108 may also prompt the user to create a new contact based on the text message operation information. If a new contact is created, the contact information (including the first and last name of the sender or recipient of the text message, the company name, and the phone number) is saved to the contacts database 308 so as to be available to all smart devices 102 in the system 100 to assist with automatically categorizing all other smart device operations. If the monitoring application 108 cannot access the text message history or log on the smart device 102, the monitoring application 108 may monitor the hardware and/or software APIs associated with the telephony stack on the smart device 102. When a text message operation occurs, a change in the state of the hardware and software is recorded and associated with the text message activity. The monitoring application 108 may then create a log comprising the number of text messages sent and received, the length of the text messages, the date and time the text messages were sent or received, and the phone numbers associated with the text messages and other related text message information.

Web Site Browsing Operations.

In accordance with an embodiment of present disclosure, the amount of data traffic resulting from a website browsing operation using a smart device 102 is apportioned between work purposes and personal purposes. The monitoring application 108 obtains operation information associated with browsing websites, such as the amount of data traffic sent and received by the smart device 102 through WiFi, Bluetooth, tethering, and a cellular connection, the IP address and/or domain name of the websites being visited, and URL (via an operating system or web browser API) of a website being visited, the status of the cellular data connection of the smart device (including whether the smart device 102 is roaming), the associated LAC, the status of the WiFi data connection, and the MAC address of a connected WiFi router. The monitoring application 108 sends the browsing operation information to the metering and tariffing application 118 which cross-references with contact information in the contacts database 308 and website information in a website database 314 to attempt to determine whether the websites being visited were for personal or work purposes. The metering and tariffing application 118 may apportion the website browsing operation according to the categorization of a contact having an email address with the same domain name as the website. For example, the contact manager may import "jon.doe@abc.com" as a customer from the CRM system and designate as a work contact. Website browsing operations associated with visits to the "abc.com" website would, accordingly, be designated as a work purpose. Website browsing operations associated with visits to corporate, affiliate, supplier, partner, and customers intranet and Internet web sites may also be categorized as for work purposes. Each user may also have a customized list of work and personal webpages, which may be manually categorized as work or personal, and stored in the website database 314. For example, a marketing executive may need to monitor the www.facebook.com website for work related marketing metrics and, accordingly, operations associated with this browsing this website would be categorized as a work purpose rather than personal purpose. If neither the smart device's 102 operating system nor web browser has an API, then the monitoring application 108 records the times when the web browser was opened and closed. The monitoring application 108 or the metering and tariffing application 118 can then subtract the smart device's 102 data consumption resulting from all other sources to determine the data consumption of the web browser during the period it was open. Other sources of data consumption include applications residing on the smart device 102, the operating system, mapping software, voice recognition software, and hardware elements which cause data traffic. In an embodiment, the monitoring application 108 asks the user to designate or categorize e recently visited website as either for personal or work purposes if it hasn't already been automatically categorized by the metering and tariffing application 118 or manually categorized by the user or an administrator of the system 100. If the smart device's 102 internet traffic is filtered by a proxy server or gateway server, the metering and tariffing application 118 may record the MAC Address, the IP Address, and any other information that may be required to identify the user of the smart device 102. This information may then be compared against the Website databases 314 to assign an activity to a specific smart device 102 which is tied to the corresponding user. The amount of traffic passing from or to the smart device 102 through the proxy or gateway server may be recorded and time stamped along with the IP address with which the smart device 102 is communicating to determine if traffic should be apportioned to the work or personal category.

Application Operations.

In accordance with an embodiment of the present disclosure, data traffic resulting from application operations is apportioned between work purposes and personal purposes. Applications include, without limitation, the operating system of the smart device 102 and any application built into the operation system, native applications pre-loaded on the smart device 102 prior to the time of sale to the user, and applications installed on the smart device 102 by a user. Applications may perform certain operations on the smart device 102 (application operations) which may result in the smart device 102 consuming data. For example, applications such as the smart device 102 operating system may periodically ping or be pinged by the operating system manufacturer or an original equipment manufacturer (OEM) for device updates such as new versions of the operating system, patches, and bug fixes. Both pinging and receiving the update may cause the smart device 102 to consume data. For example, the iOS™ operating system is provided with updates from its manufacturer, APPLE™. The operating system may also communicate with cloud-based servers to provide certain functionality. The monitoring application 108 records application information including, without limitation, the amount of data traffic consumed by each application, the method of communication such as cellular network or WiFi, the port on which each application communicates, application names, application publisher names, application versions, application unique codes provided by the portal through which applications have been made available (such as ITUNES™, GOOGLE PLAY™, and WINDOWS MARKETPLACE™), the IP-addresses required by the applications and whether the IP addresses are external or internal to the enterprise IT environment 126, the type or category of the applications, what portion of the data was inbound and outbound, whether the smart device 102 was roaming, the associated LAC, the WiFi data connection status, and the associated MAC, address of a WiFi router, if any. The unique code may be provided by the operation system provider for which the application is written. Categories or types of applications including VOIP, CRM, travel, etc. The monitoring application 108 sends the application information to the metering and tariffing application 118 which apportions data traffic generated by applications as work and personal. The metering and tariffing application 118 may maintain an application database 310 for each smart device 102 or user containing applications information including the category of each application. The metering and tariffing application 118 cross-references the application information with the applications database. 310 to help automatically apportion data traffic generated by application as work and personal. Applications listed in the applications database 310 may be categorized as work or personal according to where it is published. If an application was purchased or built for work purposes, the application may be designated as work and any data traffic associated with that application would, accordingly, be categorized as work. An application may be designated as work if the application was made available via an enterprise application store. When an application is first installed on the smart device 102, the monitoring application 108 may determine whether the application is designated as work or personal using the application database 310. If the application is designated as personal, the monitoring application 108 may notify the user that they are responsible for costs resulting from the use of the application. If the application is not listed in the applications database 310, the user is asked by the monitoring application 108 to categorize the application as either for a work or a personal purpose. Applications such as the operating system may be categorized by the administrator as work or personal. The category of the application may then be recorded in the applications database 310 so as to be available to all smart devices 102 in the system 100 to assist with automatically categorizing application use.

If neither the smart device's 102 operating system nor application which is to be monitored has an API, then the monitoring application 108 records the times when the application was opened and closed. The monitoring application 108 or the metering and tariffing application 118 can then subtract the smart device's 102 data consumption resulting from all other sources to determine the data consumption of the application during the period it was open. Other sources of data consumption include other applications residing on the smart device 102, the operating system, mapping software, voice recognition software, and hardware elements which cause data traffic. In an embodiment, the monitoring application 108 asks the user to designate or categorize an application as either for personal or work purposes. The amount of data flowing from/to the smart device 102 through the proxy may be captured and/or time and/or date stamped. The IP address may be compared to the Enterprise App Databases, and/or the captured information then put under the Work category. Logging of activity may also occur on the Proxy/Gateway Server. The application may send/receive data traffic from the originator/manufacturer of the application. Additional and/or alternate inbound/outbound data traffic may be generated from sub-component functions within the application including IP traffic from operating system vendor, advertising engines that send advertisements to the application, and the storefront from which the application was purchased.

Applications sometimes passively, without user action, perform operations which generate data traffic. For example, social networking applications may automatically download status updates. In an embodiment, the data traffic is apportioned according to how the application has been categorized. In another embodiment, where various contacts associated with the social networking application have already been categorized as personal or work, data traffic associated with each of the contacts can be apportioned to personal or work. Data traffic associated with updating the operating system may also occur. That data traffic can be automatically be apportioned to work, personal, or both work and personal in accordance with a weighted average or any other methodology determined or rules set by an administrator.

Voice Recognition Operations.

In accordance with an embodiment of the present disclosure, the amount of data traffic resulting from voice recognition application operations is apportioned between personal and work purposes. Voice recognition applications may be built into the operating system of the smart device 102 or into another application on the smart device 102, or may be stand-alone applications residing on the smart device 102. Voice recognition applications may include, for example, SIRI™ on iOS™. Data traffic generated by voice recognition application operations may be apportioned into personal and work categories similar to data traffic generated by application operations, generally, as described herein. In an embodiment, all data traffic generated by voice recognition application operations is apportioned to work use when the user is traveling, for work purposes, with the smart device 102. This is to encourage the user to use voice recognition software when, for example, they are driving to promote user safety. Voice recognition application may sometime be required by the user to recognize a voice command associated with a contact. For example, the voice command may be given by the user to call, send SMS message, or send an email to a contact, a phone number, or an email address. A voice command may be given by a user to read a text message or email from a contact. A user may also use voice recognition to dictate a message to be sent to a contact via text message or email. In these cases, contact information stored in the contacts database 308 may be used to apportion the data traffic associated with the voice commands to either work or personal. In an embodiment, the monitoring application 108 records operation information associated with a voice command. The voice command operation information may comprise contact information, and the amount of data associated with the voice command. The monitoring application 108 sends the voice command information to the metering and tariffing application 118 which cross-references the contact information with the contacts database 308 to help automatically apportion the data traffic between personal and work purposes. In an embodiment, if no contact information is contained within the voice command operation information, the user is prompted to categorize the voice recognition data traffic as either work or personal.

Mapping Operations.

In accordance with an embodiment of the present disclosure, data traffic generated by a mapping application operation is apportioned between personal and work operations. Mapping applications may be built into the operating system of the smart device 102 or into another application on the smart device 102, or may be stand-alone applications residing on the smart device 102. Mapping applications may include, for example, NOKIA MAPS™ for iOS™. Data traffic generated by mapping applications may be apportioned between personal and work categories similar to any other data traffic generated by any other application as described herein. In an embodiment, all data traffic generated by mapping applications is apportioned to work use when the user is traveling, for work purposes, with the smart device 102. Mapping applications may sometime be required to map a location associated with a contact. For example, the user may request the mapping application to provide directions to a contact's home address or work address. The contact information may, accordingly, be used to apportion the data traffic associated with the mapping application to either work or personal. In an embodiment, the monitoring application 108 records operation information associated with a mapping application operation. The mapping operation information may comprise contact information, and the amount of data associated with mapping addresses. The monitoring application 108 may also access mapping applications through APIs to extract addresses that may have been entered. Those addresses are associated with a certain amount of data traffic resulting from their mapping. The monitoring application 108 sends the mapping information to the metering and tariffing application 118 which cross-references the contact information or addresses with the contacts database 308 to help automatically apportion the data traffic between personal and work purposes.

If the mapping data traffic cannot be apportioned or categorized because the address cannot be located within the contacts database 308, the metering and tariffing application 118 may cause the monitoring application 108 to prompt the user to categorize the address as either for a work or a personal purpose, or associate the address with an existing contact in the contacts database 308. The monitoring application 108 may also prompt the user to create a new contact based on the mapping information. If a new contact is created, the mapping information is saved to the new contact in the contacts database 308 so as to be available to all smart devices 102 in the system 100 to assist with automatically categorizing smart device use.

Tethering Operations.

In accordance with an embodiment of the present disclosure, data traffic generated as a result of tethering operations, namely, tethering a device to the smart device 102, is apportioned between personal and work operations. For example, a user's spouse may tether their device to the smart device 102 while on vacation. Tethering can be accomplished by connecting the smart device 102 to another device by USB, WiFi, or Bluetooth. The monitoring application 108 record, through the smart device's 102 operating system APIs, a tethered device's name, MAC address, IP address, computer processing unit identification, device name, data traffic operations, and data traffic times. The monitoring application 108 sends the tethering information to the metering and tariffing application 118 to help automatically categorize tethering data traffic as personal or work. The metering and tariffing application 118 may maintain a devices database 312. All data traffic associated with tethered devices registered as personal devices for a user is apportioned to personal purposes. If the tethered device is not located in the devices database 312, the device is identified as a new device and the user is prompted to categorize the device as a personal device or a work device. The device information, including the CPU ID, IMEI number, phone number, CCID number, serial number, and MAX number are saved to the devices database 312 by the metering and tariffing application 118 so that the monitoring application 108 on any other smart device 102 may use the information.

VOIP Operations.

In accordance with an embodiment of the present disclosure, data traffic generated as a result of a voice over Internet protocol session operation including, but not limited, to video conferencing, unified communications, and instant messaging, with the smart device 102 is apportioned between personal and work operations, VOIP may be built into the operating system of the smart device 102 or into another application on the smart device 102, or may be stand-alone applications residing on the smart device 102. A VOIP applications may include, for example, SKYPE™ or FACE TIME™. Data traffic generated by VOIP may be apportioned between personal and work categories similar to any other data traffic generated by any other application as described herein. A VOIP session may sometime occur with one or more persons who are contact. The contact information may be cross-referenced by the metering and tariffing application 118 with the contacts database 208 to apportion data traffic associated with VOIP calls or sessions between work and personal. In an embodiment, the monitoring application 108 accesses a history or log of VOIP calls through APIs to extract call details such as duration, phone number, and contact information. That VOIP information is then used by the metering and tariffing application 118 to apportion data traffic associated with the calls to personal or work. If a VOIP call cannot be automatically categorized as work or personal, the monitoring application 108 prompts the user to associate the call with a contact which has already been categorized, to create a new contact and categorize the contact, or to simply categorize the call as work or personal. Information manually entered by the user may be saved by the metering and tariffing application 118 to the contacts database 808 for later use by a monitoring application 108 for all devices 102 in the system 100.

Email Operations.

In accordance with an embodiment of the present disclosure, data traffic generated as a result of email operations is apportioned between work and personal. The monitoring application 108 may integrate, through APIs, with the personal and corporate email clients on the smart device 102. The email clients may be one client or multiple clients. For each email, the monitoring application 108 determines the sender and recipient email addresses, the time the email was sent/received, the size of the email including attachments, and the size of the email including attachments actually downloaded to the smart device 102. Email operations may be apportioned between personal and work categories similar to any other operation by any other application as described herein. In an embodiment, the email addresses contained in an email are cross-referenced by the metering and tariffing application 118 to contact information in the contacts database 308 to categorized data traffic associated with email use as work or personal. If an email cannot be automatically determined to be work or personal, the monitoring application 108 prompts the user to allocate the email as either work or personal and the email addresses in the email are all then categorized accordingly. Email operation information manually entered by the user may be saved by the metering and tariffing application 118 to the contacts database 308 for use by all smarted devices 102 that are part of the system 100 to assist with apportioning smart device use between personal and work. In an embodiment, the metering and tariffing application 118 categorizes emails as either work or personal according to the domain part of the email address. Email addresses comprising a domain part which are publicly available such as "@hotmail.com" are categorized as personal. Email addresses comprising a domain part which is a corporate or private domain are categorized as work. Email clients may also be designated as personal or work and, categorized accordingly. For example, GOOGLE™ provides a GMAIL™ client for the IPHONE™. All emails sent and received from the GMAIL client, accordingly, may be categorized by the metering and tariffing application 118 as work. All email send from and receives by each email client is monitored in aggregate and designated as either personal or work in accordance with the rules provisioned in the metering and tariffing application 118. The metering and tariffing application 118 may comprise an email client database for retaining a list of email clients and their categories.

Purchase Operations.

In addition to using a smart device 102 for communication, a user may also make purchases with the smart device 102 (also referred to as purchase operations). For example, a user may use the smart device's 102 near field communications (NFC) or radio frequency identification (RFID) functionality to make a purchase from a retail store. In another example, the user may purchase an application, or make an in-application purchase, on their smart device 102. Those purchase may be charged back so as to appear on the network operator invoice or statement of amounts owing for the smart device 102. In an embodiment of the present disclosure, the monitoring application 108 identifies when a purchase is being made using the smart device 102 (also referred to as a purchase operation), collects the associated operation information, and communicates the operation information to the metering and tariffing application 118. The metering and tariffing application 118 then, using this operation information, determines whether a user's purchase is for a work purpose or a personal purpose based on information such as the type of purchase, from whom the purchase was made, when the purchase was made, and where the purchase was made. In an embodiment, the monitoring application 108 detects a purchase made using the smart device 102 by detecting data traffic with an IP address that typically corresponds with a purchase. In response to detecting a purchase operation, the monitoring application may prompt the user to categorize the purchase as either work or personal.

Figure 4:
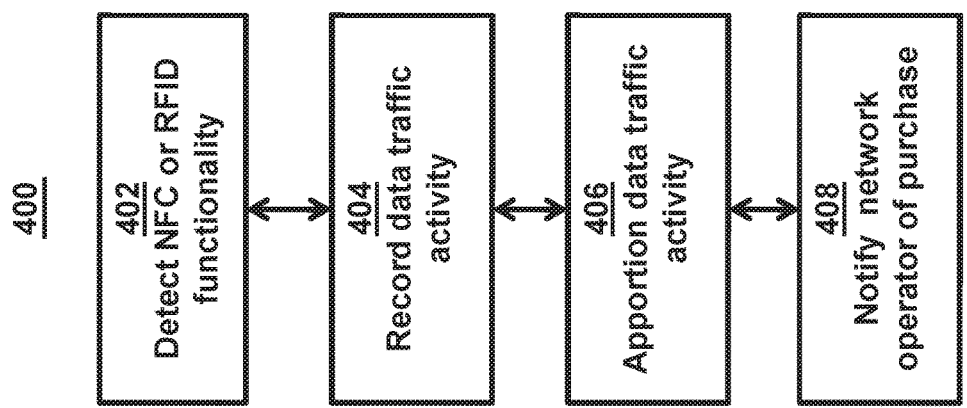
FIG. 4. shows a flowchart of a method for apportioning costs of a purchase made with a smart device as shown in FIG. 1 between purposes in accordance with the present disclosure.

FIG. 4. is a flowchart of a method 400 for apportioning the costs of a purchase made with a smart device 102 between purposes in accordance with an embodiment of the present disclosure. When the smart device 102 is used to make a purchase, that purchase may generate data traffic to be categorized as either work or personal. The generated data traffic may also be used, however, to automatically determine if the purchase being made is personal or work. In accordance with an embodiment of the present disclosure, the monitoring application 108 detects 402 that the NFC or RFID functionality of the smart device 102 has been used. Upon detection, the monitoring application 108 records all data traffic activity 404 occurring on the smart device 102 for a period of time before and after the use of the functionality. The period of time may be 60 seconds. Information recorded may include the time of use and the IP addresses of the other devices with which the smart device 102 is communicating. The IP addresses is compared or cross-referenced to IP addresses maintained by the metering and tariffing application 118 to determine if the data traffic and associated purchase should be apportioned 406 as work or personal. If the IP address has not yet been categorized, the monitoring application 108 may prompt the user to categorize the purchase as either work or personal. The monitoring application 108 may also prompt the user to specify the amount of the transaction and other related information such as taxes. The metering and tariffing application 118 then saves the IP information and selected category to a purchase database 316 for use at a later time by the smart device 102 or other smart devices 102 in the system. In an embodiment, the monitoring application 108 and the metering and tariffing application 118 may have APIs for which other applications may use to access information and functionality.

The monitoring application 108 and the metering and tariffing application 118 may integrate with another party's billing system, such as a network operator, so as to notify 408 the operator of purchases made on the smart device 102 that should be charged directly to the user of the smart device 102. Information that may be provided to the network operator includes the phone number of the smart device 102, IMEI number of the smart device 102, the serial number of the smart device 102, the time and date of the transaction, the roaming status, the name of the application or upgrade downloaded, if any, the version of the application, the name of the party from which the purchase was made, the cost of the transaction and any taxes. If the operator has an individual contract with the user of the smart device 102, the monitoring application 108 may prompt the user for permission to integrate with the operator.

In an embodiment, the monitoring application 108 may monitor the smart device 102 and automatically take certain actions to help reduce the smart device's 102 communication costs.

Containers.

The smart device 102 may comprise one or more containers (also referred to as dual personas) which prevents applications outside of the container from accessing the applications inside the container. If applications are located within a container on the smart device 102 to which the monitoring application 108 does not have access, the monitoring application 108 monitors the amount data traffic from and to the container. Since a single container contains applications for either exclusively work purposes or exclusively personal purposes, but not for both, all data traffic from and to the container can be apportioned to the corresponding purpose without identifying the specific source of the data traffic. If the monitoring application 108 has access to the container or is located within the container, the monitoring application 108 may monitor the smart device 102 operations. If an enterprise container resides on the smart device 102, or the application does not have an API, or all communication and activity information can't be determined for the application, the logged information may be compared against a databases and the metering and tariffing application 118 may assign the activity to the smart device 102 which is used by a user.

WiFi Switchover.

Communication over a WiFi network is typically less costly both in monetary value and power consumption, than communication over a cellular network. In an embodiment of the present disclosure, the monitoring application 108 causes the smart device 102 to automatically, without user involvement, log on to WiFi hotspots to help reduce communication costs. The monitoring application 108 may record the LAC of a cellular radio network used by the smart device 102, the GPS coordinates of the smart device 102, the name of the provider and name of the retail outlet when the smart device 102 logs into a WiFi hotspot such as, for example, at the user's work or home locations. The monitoring application 108 may then use this information to automatically enable the smart devices 102 WiFi function and disable the cellular network function when the mobile device 102 is close to the recorded GPS coordinates or within the LAC. By enabling WiFi, logging into the corresponding WiFi network, and disabling the cellular network functions, this causes the smart device 102 to use the WiFi mode of communication which may be the least costly. This may also help reduce the amount of power consumed by the smart device 102 so as to preserve battery life. When the smart device 102 loses WiFi connectivity, the cellular network function on the smart device 102 may then be enabled. In an embodiment of the present disclosure, the monitoring application 108 communicates WiFi information to the metering and tariffing application 118 so that it can be stored and shared with other smart devices comprising a monitoring application 108 in communication with the metering and tariffing application 118. In this way, a database of global WiFi hotspots may be maintained by the metering and tariffing application. WiFi information may include, for example, WiFi Network Name, Password, IP Address, Subnet Mask, Default Gateway, DNS, DNS Suffix, MAC Address, LAC of the surrounding cellular network, and GPS coordinates.

Voice Call Interception.

In accordance with an embodiment of the present disclosure, the monitoring application 108 intercepts calls about to be made for which there is a less expensive calling option, and places the call using the less expensive calling option. For example, the monitoring application 108 may intercept long distance calls or calls to be made while roaming and places the call using a long distance dialing card, a toll-free number, VOIP call, or a local calling number. The less expensive options may vary depending on the telephone number being called and the location of the smart device 102. Accordingly, it may not be possible for a user to recall all possible less expensive calling options. It may also be difficult or inconvenient for a user to manually effect a less expensive calling option. In an embodiment, if the cost of a voice call may be reduced, the call is blocked, a note of the outbound call is made, and a new voice calling session is created using the less expensive option. The less expensive calling option may require inserting pauses using commas or some other symbol according to the location from where the call is being made. A global database of less expensive calling options may be maintained by the metering and tariffing application 118 and communicated to the monitoring application 108 on all smart devices 102.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skilled in the art without departing from the scope, which is defined solely by the claims appended hereto.

What is claimed is:

1. A system comprising:
   a processing unit;
   a memory storing operation information concerning a plurality of operations that had been performed on a smart device, the plurality of operations corresponding to a plurality of purposes, each of the plurality of operations the result of prior use of the same network connection of a network of an operator by the smart device;
   the memory storing a metering and tariffing application having been provisioned with a plurality of general rules prior to the plurality of operations occurring, the metering and tariffing application configured for execution on the processing unit to automatically apportion the operation information for the plurality of operations between the plurality of purposes based on the operation information in accordance with the plurality of general rules; and the memory storing tariffs of the operator for use of the network by the smart device, the metering and tariffing application configured to determine the cost for the use of the network by the smart device for at least one of the plurality of purposes based on the tariffs.

2. The system of claim 1, wherein the memory comprises categorization information, and wherein the plurality of rules requires the metering and tariffing application to apportion the operation information of the operations to the selected purposes based on the operation information corresponding to the categorization information.

3. The system of claim 2, wherein the metering and tariffing application is configured to obtain the categorization information from one or more applications.

4. The system of claim 2, wherein the metering and tariffing application is configured to obtain the categorization information from a plurality of sources, and the rules require apportioning the operation information of the operations between the purposes based on the sources of the categorization information.

5. The system of claim 4, wherein the metering and tariffing application is provisioned with a first rule of the plurality of rules requiring apportionment of the operation information of the operations to a personal purpose in response to their categorization information having been obtained from a cloud server.

6. The system of claim 4, wherein the metering and tariffing application is provisioned with a first rule of the plurality of rules requiring apportionment of the operation information of the operations to a work purpose in response to their categorization information being obtained from an enterprise information technology environment.

7. The system of claim 2, wherein the categorization information comprises contact information, the contact information comprising designations, and wherein the rules requires the metering and tariffing application to apportion the operation information of the operations to the purposes in response to the designations.

8. The system of claim 2, wherein the operation information comprises information relating to one or more of the following operations: a cellular voice call made or received by the smart device, a text message sent or received by the smart device, data consumption from browsing a website with the smart device, network data consumption from using a third application on the smart device, network data consumption from using a voice recognition application on the smart device, network data consumption from using a mapping application on the smart device, network data consumption from tethering another device to the smart device, network data consumption from using a voice over Internet protocol application on the smart device, network data consumption from using an email application on the smart device, network data consumption from making a purchase with the smart device, the purchase made with the smart device.

9. The system of claim 8, wherein the smart device comprises a near field communication device or a radio frequency identification device, the metering and tariffing application is configured to detect use of the near field communication device or the radio frequency identification device for a purchase operation, the operation information for the purchase operation comprises an amount of data consumed as a result of the purchase operation, and a first internet protocol address with which the smart device was communicating in response to the purchase operation; and the categorization Information comprises a list of internet protocol addresses and a designated purpose for each internet protocol address, and wherein the metering and tariffing application is configured to apportion the operation information of the purchase operation by setting the selected purpose to the designated purpose of a second internet protocol address from among the list of internet protocol addresses which matches the first internet protocol address.

10. The system of claim 1, wherein the metering and tariffing application is configured to apportion one of the operation information of the operations to the selected purpose from among the plurality of purposes comprising a work purpose and a personal purpose, based on the operation information.

11. The system of claim 1, wherein the metering and tariffing application is provisioned with a first general rule of the plurality of general rules, the first general rule requiring the operation information of the operations to be apportioned to a select purpose based on a domain of a contact of the corresponding the operation information.

12. The system of claim 1, wherein the metering and tariffing application is provisioned with a first general rule of the plurality of general rules, the first general rule requiring the operation information of the operations performed by a select application on the smart device to be apportioned to a select purpose according.

13. A system, comprising
a processing unit;
a memory accessible by the processing unit, the memory storing operation information for a plurality of operations that had been performed on a smart device, the plurality of operations corresponding to a plurality of purposes, each of the plurality of operations the result of prior use of the same network connection of a network of an operator;
a metering and tariffing application provisioned with a plurality of general rules and configured to obtain categorization Information from one or more of an enterprise information technology environment and a cloud server; and
the metering and tariffing application for execution on the processing unit to automatically apportion the operation information for the plurality of operations between a plurality of purposes in accordance with the rules and based on the categorization information.

14. The system of claim 13, wherein a first rule of the plurality of rules requires apportioning operation information to a first selected purpose in response to the operation information corresponding to categorization information obtained from the enterprise information technology environment, and a second rule of the plurality of rules requires apportioning operation information to a second selected purpose in response to the operation information corresponding to the categorization information obtained from the cloud server.

15. The system of claim 13, wherein the memory stores tariffs of the operator for use of the network by the smart device, and wherein the metering and tariffing application is configured to determine costs for the use of the network by the smart device for each of the plurality of purposes based on the tariffs and the apportioned operation information.

16. A processor implemented method comprising:
receiving a plurality of general rules;
receiving tariffs of the operator;
receiving operation information about a plurality of operations on a smart device which occurred after receiving the plurality of general rules, the plurality of operations corresponding to a plurality of purposes, each of the plurality of operations the result of prior use of the same network connection of a network of an operator;
automatically apportioning the operation information for the plurality of operations of the smart device to the plurality of purposes based on the operation information according to the plurality of general rules; and
determining the cost of use of the network for one of the plurality of purposes based on the tariffs.

17. The method of claim 16, further comprising obtaining categorization information one or more sources, and wherein automatically apportioning the operation information of the operations is in accordance with the categorization information.

18. The method of claim 17, wherein the categorization information is obtained from a plurality of sources, and the operation information of the operations are apportioned between the purposes in accordance with the rules based on the sources of the categorization Information.

19. The method of claim 18, wherein the operation information for first selected operations are apportioned to a first selected purpose in response to the first selected operations corresponding to categorization information obtained from the enterprise information technology environment, and the operation information for second selected operations are apportioned to a second selected purpose in response to the second selected operations corresponding to categorization information obtained from a cloud server.

20. The system of claim 17, wherein the categorization information comprises contact Information, the contact information comprising a designation indicating to which of the plurality of purposes the contact Information relates.

21. The method of claim 16, wherein the plurality of purposes comprises a work purpose and personal purpose.

22. The method of claim 16, wherein automatically apportioning the operation information of the operations comprises apportioning the operations information to a select purpose based on a domain of a contact of the corresponding operation.

23. The method claim 16, wherein automatically apportioning the operation information of the operations comprises apportioning the operations information to a select purpose based on the operations being performed by a select application on the smart device.

* * * * *